US010614557B2

(12) United States Patent
Lin et al.

(10) Patent No.: US 10,614,557 B2
(45) Date of Patent: Apr. 7, 2020

(54) DIGITAL IMAGE COMPLETION USING DEEP LEARNING

(71) Applicant: Adobe Inc., San Jose, CA (US)

(72) Inventors: Zhe Lin, Fremont, CA (US); Xin Lu, Mountain View, CA (US); Xiaohui Shen, San Jose, CA (US); Jimei Yang, Mountain View, CA (US); Jiahui Yu, Champaign, IL (US)

(73) Assignee: Adobe Inc., San Jose, CA (US)

( * ) Notice: Subject to any disclaimer, the term of this patent is extended or adjusted under 35 U.S.C. 154(b) by 79 days.

(21) Appl. No.: 15/785,359

(22) Filed: Oct. 16, 2017

(65) Prior Publication Data

US 2019/0114748 A1  Apr. 18, 2019

(51) Int. Cl.
*G06T 5/00* (2006.01)
*G06N 3/04* (2006.01)
(Continued)

(52) U.S. Cl.
CPC ............... *G06T 5/005* (2013.01); *G06N 3/04* (2013.01); *G06N 3/0454* (2013.01); *G06N 3/0472* (2013.01); *G06N 3/0481* (2013.01); *G06N 3/08* (2013.01); *G06T 5/20* (2013.01); *G06T 2207/20081* (2013.01); *G06T 2207/20084* (2013.01); *G06T 2207/20104* (2013.01)

(58) Field of Classification Search
None
See application file for complete search history.

(56) References Cited

U.S. PATENT DOCUMENTS 8,233,739 B1  7/2012  Cho et al.
8,249,365 B1  8/2012  Winnemoeller et al.
(Continued)

FOREIGN PATENT DOCUMENTS

GB  2255699  11/1992

OTHER PUBLICATIONS

"Final Office Action", U.S. Appl. No. 15/679,602, dated Feb. 13, 2019, 25 pages.
(Continued)

*Primary Examiner* — Kevin Ky
(74) *Attorney, Agent, or Firm* — SBMC

(57) ABSTRACT

Digital image completion using deep learning is described. Initially, a digital image having at least one hole is received. This holey digital image is provided as input to an image completer formed with a framework that combines generative and discriminative neural networks based on learning architecture of the generative adversarial networks. From the holey digital image, the generative neural network generates a filled digital image having hole-filling content in place of holes. The discriminative neural networks detect whether the filled digital image and the hole-filling digital content correspond to or include computer-generated content or are photo-realistic. The generating and detecting are iteratively continued until the discriminative neural networks fail to detect computer-generated content for the filled digital image and hole-filling content or until detection surpasses a threshold difficulty. Responsive to this, the image completer outputs the filled digital image with hole-filling content in place of the holey digital image's holes.

20 Claims, 9 Drawing Sheets

(51) Int. Cl.
G06N 3/08 (2006.01)
G06T 5/20 (2006.01)

(56) References Cited

U.S. PATENT DOCUMENTS

| | | | |
|---|---|---|---|
| 8,340,463 | B1 | 12/2012 | Cho et al. |
| 9,208,548 | B1 | 12/2015 | Noble et al. |
| 9,552,626 | B1 | 1/2017 | Filra |
| 9,697,234 | B1 | 7/2017 | Dhua et al. |
| 9,922,425 | B2 | 3/2018 | Partis et al. |
| 10,134,108 | B2 | 11/2018 | Amirghodsi et al. |
| 10,198,839 | B2 | 2/2019 | Rymkowski et al. |
| 10,282,877 | B2 | 5/2019 | Bedi et al. |
| 2006/0104542 | A1 | 5/2006 | Blake et al. |
| 2012/0141045 | A1 | 6/2012 | Bae et al. |
| 2013/0051685 | A1 | 2/2013 | Shechtman et al. |
| 2013/0266208 | A1 | 10/2013 | Lim et al. |
| 2014/0201126 | A1 | 7/2014 | Zadeh et al. |
| 2014/0254882 | A1 | 9/2014 | Jin |
| 2016/0027159 | A1 | 1/2016 | Amirghodsi et al. |
| 2017/0140514 | A1 | 5/2017 | Amirghodsi et al. |
| 2017/0178325 | A1 | 6/2017 | Ye et al. |
| 2017/0278289 | A1 | 9/2017 | Marino et al. |
| 2017/0372193 | A1* | 12/2017 | Mailhe .................. G06N 3/02 |
| 2018/0096454 | A1 | 4/2018 | Amirghodsi et al. |
| 2018/0107896 | A1 | 4/2018 | Sagong |
| 2018/0121754 | A1 | 5/2018 | Carr et al. |
| 2018/0150940 | A1 | 5/2018 | Reinhard et al. |
| 2018/0165798 | A1 | 6/2018 | Lin et al. |
| 2018/0174276 | A1 | 6/2018 | Michel et al. |
| 2018/0211380 | A1* | 7/2018 | Tandon ................ G06T 7/0012 |
| 2018/0322662 | A1 | 11/2018 | Hellier et al. |
| 2018/0350030 | A1 | 12/2018 | Simons et al. |
| 2019/0043242 | A1 | 2/2019 | Risser |
| 2019/0057527 | A1 | 2/2019 | Jin et al. |
| 2019/0066268 | A1* | 2/2019 | Song ...................... G06N 3/08 |
| 2019/0066733 | A1 | 2/2019 | Somanath et al. |
| 2019/0073792 | A1 | 3/2019 | Fletcher et al. |
| 2019/0095730 | A1* | 3/2019 | Fu ....................... G06N 3/084 |
| 2019/0114511 | A1 | 4/2019 | Gao et al. |
| 2019/0114818 | A1 | 4/2019 | Lin et al. |
| 2019/0355102 | A1 | 11/2019 | Lin et al. |

OTHER PUBLICATIONS

Michel,"Completing an Image", EP Application No. 16306754.9, filed on Dec. 21, 2016, 21 pages.
"Combined Search and Examination Report", GB Application No. 1813278.7, dated Feb. 18, 2019, 5 pages.
"Combined Search and Examination Report", GB Application No. 1813319.9, dated Feb. 15, 2019, 6 pages.
"First Action Interview Office Action", U.S. Appl. No. 15/679,602, dated Sep. 28, 2018, 5 pages.
"Pre-Interview First Office Action", U.S. Appl. No. 15/679,602, dated Jun. 20, 2018, 4 pages.
Lu,"Deep Multi-Patch Aggregation Network for Image Style, Aesthetics, and Quality Estimation", In Proceedings of the IEEE International Conference on Computer Vision, Dec. 2015, 9 pages.
Achanta,"SLIC Superpixels Compared to State-of-the-Art Superpixel Methods", IEEE Transactions on Pattern Analysis and Machine Intelligence, vol. 34, No. 11, Nov. 2012, pp. 2274-2281.
Ballester,"Filling-In by Joint Interpolation of Vector Fields and Gray Levels", IEEE transactions on image processing, Apr. 2, 2001, 30 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Bertalmio,"Image Inpainting", SIGGRAPH '00: Proceedings of the 2ih annual conference on computer graphics and interactive techniques, ACM Press/Addison-Wesley Publishing Co., New York, NY, USA, 2000, 8 pages.
Chen,"Fast Patch-based Style Transfer of Arbitrary Style", Dec. 13, 2016, 10 pages.
Cimpoi,"Describing Textures in the Wild", In Proceedings of the IEEE Conference on Computer Vision and Pattern Recognition, Nov. 15, 2013, 13 pages.
Dai,"Deformable Convolutional Networks", Jun. 5, 2017, 12 pages.
Darabi,"Image Melding: Combining Inconsistent Images using Patch-based Synthesis", ACM Transactions on Graphics 31, 4, 82, Aug. 2012, 10 pages.
Efros,"Image Quilting for Texture Synthesis and Transfer", SIGGRAPH 2001, Computer Graphics Proceedings, ACM Press/ACM SIGGRAPH, E. Fiume, Ed.,, 2001, 6 pages.
Efros,"Texture Synthesis by Non-parametric Sampling", In: IEEE International Conference on Computer Vision. (1999), Sep. 1999, 6 pages.
Farbman,"Convolution Pyramids", ACM Trans. Graph. 30, 6, Nov. 2012, 9 pages.
Gatys,"Image Style Transfer Using Convolutional Neural Networks", In Proc. CVPR, 2016., Jun. 2016, pp. 2414-2423.
Gatys,"Preserving Color in Neural Artistic Style Transfer", https://arxiv.org/abs/1606.05897, Jun. 19, 2016, 8 pages.
Glasner,"Super-Resolution from a Single Image", Super-Resolution form a Single Image, Oct. 20, 2009, 8 pages.
Goodfellow,"Generative Adversarial Nets", Jun. 10, 2014, 9 pages.
Gulrajani,"Improved Training of Wasserstein GANs", Dec. 25, 2017, 20 pages.
Hays,"Scene Completion Using Millions of Photographs", ACM SIGGRAPH, vol. 26, 4:1-4, 2007, 7 pages.
He,"Deep Residual Learning for Image Recognition", Dec. 10, 2015, 12 pages.
He,"Statistics of Patch Offsets for Image Completion", ECCV 2012, 2012, 14 pages.
Huang,"Image Completion using Planar Structure Guidance", Proceedings of ACM SIGGRAPH 2014, Jul. 2014, 10 pages.
Jaderberg,"Spatial Transformer Networks", Feb. 4, 2016, 14 pages.
Jeon,"Active Convolution: Learning the Shape of Convolution for Image Classification", May 27, 2017, 9 pages.
Johnson,"Perceptual Losses for Real-Time Style Transfer and Super-Resolution.", Mar. 27, 2016, 18 pages.
Karras,"Progressive Growing of GANs for Improved Quality, Stability, and Variation", Feb. 26, 2018, 26 pages.
Klose,"Sampling Based Scene-Space Video Processing", ACM Transactions on Graphics (TOG)—Proceedings of ACM SIGGRAPH 2015, Aug. 2015, 11 pages.
Kohler,"Mask-specific Inpainting with Deep Neural Networks", Oct. 15, 2014, 12 pages.
Kohli,"Robust Higher Order Potentials for Enforcing Label Consistency", Retrieved from <<http://research. microsoft.com/en-us/um/people/pkohli/papers/klt_ cvpr08. pdf>> on Jun. 19, 2009, Jan. 2009, 8 pages.
Kwatra,"Graphcut Textures: Image and Video Synthesis Using Graph Cuts", ACM Trans. Graph. 22 (2003), 3, 2003, 10 pages.
Lee,"Deeply-Supervised Nets", Sep. 25, 2014, 10 pages.
Levin,"Seamless Image Stitching in the Gradient Domain", Proceedings of the European Conference on Computer Vision, May 2004, pp. 377-389.
Li,"Combining Markov Random Fields and Convolutional Neural Networks for Image Synthesis", In Proceedings of the IEEE Conference on Computer Vision and Pattern Recognition, Jan. 18, 2016, 9 pages.
Li,"Generative Face Completion", Apr. 19, 2017, 9 pages.
Liu,"Deep Learning Face Attributes in the Wild", Jan. 24, 2015, 11 pages.
Liu,"Exemplar-based Image Inpainting using Multiscale Graph Cuts", IEEE Transactions on Image Processing—vol. 22, Issue: 5, 09/13/202, 13 pages.
Mao,"Least Squares Generative Adversarial Networks", Apr. 5, 2017, 16 pages.
Newson,"Video Inpainting of Complex Scenes", SIAM Journal of Imaging Science 7, 4, Mar. 18, 2015, 27 pages.
Nguyen,"Synthesizing the preferred inputs for neurons in neural networks via deep generator networks", Nov. 23, 2016, 29 pages.

(56) References Cited

OTHER PUBLICATIONS

Park,"Transformation-Grounded Image Generation Network for Novel 3D View Synthesis", Mar. 8, 2017, 17 pages.
Perez,"Poisson Image Editing", Proc. ACM SIGGRAPH 2003, Jul. 2003, 6 pages.
Rother,""GrabCut"—Interactive Foreground Extraction using Iterated Graph Cuts", ACM SIGGRAPH 2004, Aug. 2004, 6 pages.
Russakovsky,"ImageNet Large Scale Visual Recognition Challenge", Jan. 30, 2015, 43 pages.
Salimans,"Improved Techniques for Training GANs", In Advances in Neural Information Processing Systems, Jun. 10, 2016, 10 pages.
Simakov,"Summarizing Visual Data Using Bidirectional Similarity", In Proceedings of CVPR 2008, Jun. 23, 2008, 8 pages.
Snelgrove,"High-Resolution Multi-Scale Neural Texture Synthesis", In SIGGRAPH ASIA 2017 Technical Briefs, Nov. 27, 2017, 4 pages.
Sutton,"Reinforcement Learning: An Introduction", The MIT Press Cambridge, Massachusetts, 1998, 398 pages.
Wei,"Fast Texture Synthesis Using Tree-Structured Vector Quantization", Proceedings of SIGGRAPH 2000, 2000, 10 pages.
Wilber,"BAM! The Behance Artistic Media Dataset for Recognition Beyond Photography", Computer Vision and Pattern Recognition (cs.CV), Apr. 27, 2017, 10 pages.
Xu,"Deep Convolutional Neural Network for Image Deconvolution", In Advances in Neural Information Processing Systems, Dec. 8, 2014, 9 pages.
Yang,"High-Resolution Image Inpainting using Multi-Scale Neural Patch Synthesis", Apr. 13, 2017, 9 pages.
Yeh,"Semantic Image Inpainting with Deep Generative Models", Jul. 13, 2017, 19 pages.
Yu,"Multi-Scale Context Aggregation by Dilated Convolutions", Computer Vision and Pattern Recognition, Apr. 2016, 13 pages.
Zhou,"Places: A 10 million Image Database for Scene Recognition", Jul. 4, 2017, 14 pages.
Zhou,"View Synthesis by Appearance Flow", In European Conference on Computer Vision, Feb. 11, 2017, 16 pages.
Arjovsky,"Wasserstein GAN", Mar. 9, 2017, 32 pages.
Clevert,"Fast and Accurate Deep Network Learning by Exponential Linear Units (ELUs)", ICLR 2016, Feb. 22, 2016, 14 pages.
Iizuka,"Globally and Locally Consistent Image Completion", ACM Transactions on Graphics (TOG) 36, Jul. 20, 2017, 13 pages.
Ioffe,"Batch Normalization: Accelerating Deep Network Training by Reducing Internal Covariate Shift", Mar. 2015, 11 pages.
Pathak,"Context Encoders: Feature Learning by Inpainting", CVPR 2016, Nov. 21, 2016, 12 pages.
Radford,"Unsupervised Representation Learning with Deep Convolutional Generative Adversarial Networks", ICLR 2016, Jan. 7, 2016, 16 pages.
"Restriction Requirement", U.S. Appl. No. 15/785,386, dated Aug. 2, 2019, 6 pages.
"Non-Final Office Action", U.S. Appl. No. 15/679,602, dated Sep. 30, 2019, 9 pages.
"Pre-Interview First Office Action", U.S. Appl. No. 15/980,691, dated Dec. 10, 2019, 4 pages.
"Pre-Interview First Office Action", U.S. Appl. No. 15/785,386, dated Dec. 5, 2019, 5 pages.
"Notice of Allowance", U.S. Appl. No. 15/785,386, dated Feb. 6, 2020, 8 pages.

* cited by examiner

DIGITAL IMAGE COMPLETION USING DEEP LEARNING

BACKGROUND

Content creation systems continue to make advances in computing technologies to enhance digital images in various ways largely limited to professional photographers in the past. With these advances, content creation systems are able to generate professional quality digital images from digital images captured by device users with little to no experience or knowledge of rules for composing visually pleasing images, e.g., the rule of thirds. By way of example, content creation systems can analyze a digital image and, based on the analysis, select post-processing operations, such as cropping, zooming, filtering, and so on, to perform on the digital image. In some cases, these content creation systems remove depicted imagery (e.g., blemishes, profanity, obscuring objects, and so on) of the digital images. This removal is effective to introduce holes into a digital image. Due to this, advances in computing technologies have also been made to enable content creation systems to generate content to fill these holes.

Conventional techniques for filling such holes take a holey digital image and a mask indicative of the holes as input, and output a completed image, i.e., an image having the holes filled. However, these conventional techniques are implemented using systems that fail to produce boundary consistent, semantically reasonable, and visually pleasant digital content for filling the holes. By way of example, these conventionally configured systems generate content that includes artifacts near a boundary of the hole. These conventionally configured systems also generate hole-filling content that fails to match remaining imagery of the holey image. Due to this matching failure, these conventionally configured systems also perform post-processing operations to match the generated hole-filling imagery to the remaining imagery of the holey image, e.g., Poisson image blending. Conventionally configured image completion systems also fail to fill holes proximate image borders and arbitrarily shaped holes. Consequently, conventional image completion systems result in digital images that are not photo-realistic. These systems also impose a burden on computing resources because the hole-filling content output by them must be post-processed to be suitably incorporated with the holey digital image.

SUMMARY

To overcome these problems, digital image completion using deep learning is leveraged in a digital medium environment. Initially, a holey digital image is received that includes at least one hole a group of contiguous pixels having values indicating an absence of depicted content. This holey digital image is provided as input to an image completer, which is formed to have a framework that combines generative and discriminative neural networks based on learning architecture of the generative adversarial networks. From the holey digital image, the generative neural network is trained to generate a filled digital image that includes hole-filling content in place of holes.

By comparison, a local discriminator of the discriminative neural networks is trained to detect whether the hole-filling digital content corresponds to computer-generated or photo-realistic content. A global discriminator of the discriminative neural networks is trained to detect whether the filled digital image includes any computer-generated content. When the discriminative neural networks detect computer-generated content, the generative neural network regenerates the filled digital image, but with different hole-filling digital content in place of the holes. This iterative process continues until the discriminative neural networks fail to detect computer-generated content for the filled digital image and hole-filling content or until detection of the computer-generated content surpasses a threshold difficulty. Responsive to this, the image completer outputs the last filled digital image. Detecting whether the filled digital image includes computer-generated digital content is also effective to avoid outputting hole-filling content that is inconsistent with the remaining imagery of the holey digital image. As a result, the image completer outputs, without post-processing operations, a filled digital image where holes are filled with boundary consistent, semantically reasonable, and visually pleasant digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
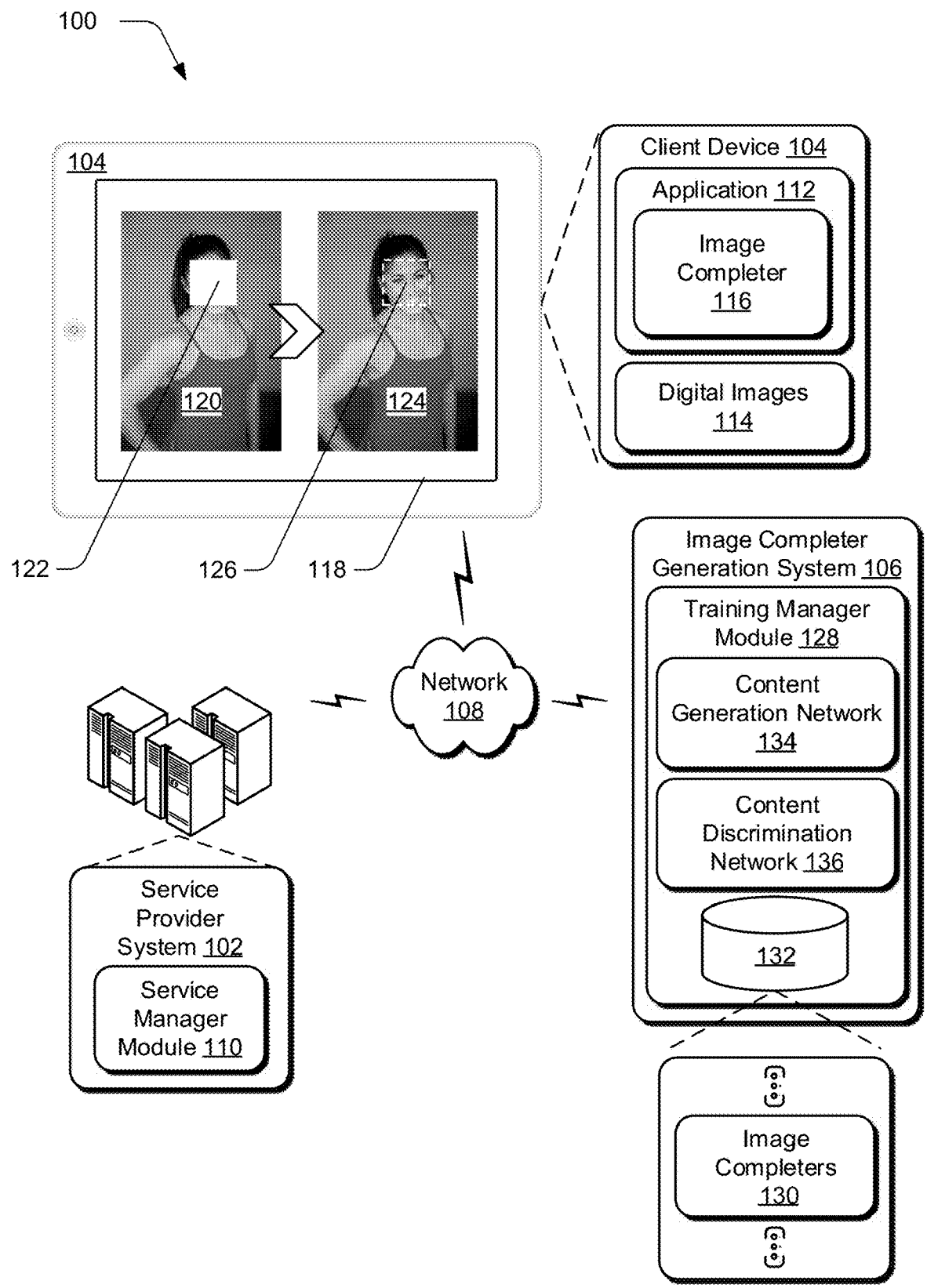
FIG. 1 is an illustration of an environment in an example implementation that is operable to employ techniques described herein.

In some cases, depicted imagery is removed from digital images, e.g., blemishes, profanity, unwanted foreground objects, and so on. This imagery can be removed via user input or automatically by a content creation system. In any case, this removal is effective to introduce holes into the digital image. Conventional techniques for filling such holes use systems that fail to produce boundary consistent, semantically reasonable, and visually pleasant digital content to fill the holes. By way of example, these conventionally configured systems generate content that includes artifacts near a boundary of the hole and/or fails to match remaining imagery of the holey image. Due to this matching failure, these conventionally configured systems also perform post-processing operations to match the generated hole-filling imagery to the remaining imagery of the holey image, e.g., Poisson image blending. These systems therefore impose a burden on computing resources, in part, because the hole-filling content output by them must be post-processed to be suitably incorporated with the holey digital image.

To overcome these problems, digital image completion using deep learning is leveraged in a digital medium environment. Initially, a digital image having at least one hole is received. This can occur in a scenario where a client device user selects to remove portions of the digital image thereby introducing the at least one hole and where the client device user then selects an option to fill the hole. Responsive to such an option, the digital image having the hole is provided to an image completion system. Holey images can be provided to the image completion system based on a variety of other operations without departing from the spirit or scope of the described techniques.

In general, the image completion system includes or has access to an image completer configured to output filled images based on received holey images. To do so, the image completer generates hole-filling content for incorporation into the holey images in place of the holes. In one or more implementations, the image completer is configured to have a network framework that combines generative and discriminative neural networks based on learning architecture of the generative adversarial networks. By way of example, the generative and discriminative neural networks are configured as convolutional neural networks trained with a modified Wasserstein Generative Adversarial Nets (WGAN) loss function rather than a simple GAN function.

In accordance with the described techniques, the generative neural network is trained to generate a proposed filled digital image from a holey digital image—the proposed filled digital image having proposed hole-filling content in place of holes. In contrast to this, the discriminative neural networks are trained to detect whether the proposed filled digital image includes computer-generated content or is suitably photo-realistic for output. The discriminative neural networks include a global neural network and separate local neural network. With regard to the detecting, the global neural network is leveraged to detect whether the proposed filled image includes computer-generated content. To this extent, the global neural network processes an entirety of the proposed filled image. By comparison, the local neural network is leveraged to detect whether the proposed hole-filling content corresponds to computer-generated content or is photo-realistic. Accordingly, the local neural network is limited to processing the hole-filling content. The local and global neural networks each output a determination regarding whether the respective proposed content is or includes computer-generated content. These determinations are combined for an overall determination regarding whether the proposed filled digital image includes computer-generated content.

If it is determined that the proposed filled digital image includes computer-generated content, then the generative neural network is again leveraged to generate a proposed filled digital image. However, this proposed filled digital image is generated based on the feedback of the discriminative neural networks to include different proposed hole-filling content than the previous proposed filled image. The generative and discriminative neural networks iteratively interact in this way until the discriminative neural networks fail to detect that the proposed filled image and the proposed hole-filling content correspond to computer-generated digital content. Alternately or in addition, the generative and discriminative neural networks iteratively interact until detection of the computer-generated content surpasses a threshold difficulty, e.g., fails to converge on a determination after a threshold amount of time. At that point, the image completer outputs the filled digital image last proposed by the generative neural network, e.g., the filled digital image relative to which the discriminative neural networks failed to detect computer-generated content. By detecting whether the filled digital image includes computer-generated digital content, the image completer avoids outputting hole-filling content that is inconsistent with the remaining imagery of the holey digital image. As a result, the image completer outputs, without post-processing operations, a filled digital image where holes are filled with boundary consistent, semantically reasonable, and visually pleasant digital content. In so doing, the burden of having to perform postprocessing operations is not imposed on image completion systems configured according to the described techniques. In contrast to conventionally configured image completion systems, the described image completer (e.g., the convolutional neural network framework) also outputs images without artifacts in the hole-filling content near hole boundaries and fills holes of various shapes.

Term Descriptions

As used herein, the term "hole" refers to a group of contiguous pixels of a digital image having values indicating an absence of depicted content. By way of example, these pixels may have null values or other values indicative of no content. In one or more implementations, these pixels may have values that cause the pixels to be displayed as white or as black. Indeed, the pixels may simply be associated with white or black pixel values. In any case, these holes appear to be inconsistent with remaining imagery depicted in holey digital images. Holes may be introduced into digital images based on a variety of operations as discussed above and below.

As used herein, the term "photo-realistic" refers to a characteristic of depicted content to appear as if it is actually part of a scene captured by an image-sensing device, e.g., a digital camera. This contrasts with depicted content appearing as if it has been generated by a computer (or drawn by a client device user) and incorporated into a digital image.

The term "post-processing" refers to operations performed in relation to digital images to modify the depicted content of those images. By way of example, post-processing operations include zooming, cropping, scaling, blending, filtering, selective color changing, and so forth. Post-processing may encompass a variety of other image modification operations without departing from the spirit or scope of the described techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ image completion using deep learning as described herein. The illustrated environment 100 includes a service provider system 102, client device 104, and image completer generation system 106 that are communicatively coupled, one to another, via a network 108.

Computing devices that are usable to implement the service provider system 102, client device 104, and image completer generation system 106 may be configured in a variety of ways. A computing device, for instance, may be configured as a desktop computer, a laptop computer, a mobile device (e.g., assuming a handheld configuration such as a tablet or mobile phone and so forth. Thus, the computing device may range from fill resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The service provider system 102 is illustrated as including a service manager module 110 that is representative of functionality to provide services accessible via the network 108 to client device users. The service manager module 110, for instance, may expose content or functionality that is accessible via the network 108 by an application 112 of the client device 104. The application 112 may be configured as a network-enabled application, a browser, a native application, and so on, that obtains data from the service provider system 102 via the network 108. This data can be employed by the application 112 to enable a user of the client device 104 to communicate with the service provider system 102, such as to receive application updates and features when the service provider system 102 provides functionality to manage content editing applications.

In the context of the described techniques, the application 112 includes functionality to edit digital content, such as digital images 114. In the illustrated example, the application 112 includes image completer 116 that is implemented at least partially in hardware of the client device 104, in part, to fill holes of holey digital images. Broadly, speaking a "hole" refers to a region of contiguous pixels of a digital image having values indicating an absence of depicted content. In these regions, depicted content may have been removed, such that the corresponding pixels have null values, empty values, values for white pixels, values for black pixels, and so forth. A hole may be present in a digital image 114 due to a user of the client device 104 interacting with the application 112 to remove an object from a digital image, to erase a portion of the image, to cut a portion from the image, and so on. Alternately or in addition, the application 112 may introduce holes into the digital images, such as by removing portions of an image automatically, e.g., based on a user selection to remove particular content (e.g., profanity, trademarked content, blemishes, etc.), user selection of an auto-correction feature, and so on.

In any case, the client device 104 is shown displaying holey image 120 having hole 122 via display device 118. The image completer 116 is configured to fill the hole 122 of the holey image 120 to produce filled digital image 124. Rather than the hole 122, the filled digital image 124 includes network-generated content 126. In one or more implementations, the image completer 116 generates the network-generated content 126 by determining values for the corresponding pixels with neural networks trained using deep learning, e.g., generative and discriminatory convolutional neural networks. The image completer 116 determines these values in substantially real-time to generate the network-generated content 126 so that, without post-processing, the network-generated content 126 is consistent with remaining content of the holey image 120 proximate a boundary of the hole 122, semantically reasonable, and visually pleasant. The image completer 116 is also capable of filling multiple holes of a holey image and filling holes having a variety of shapes, e.g., rectangular, ellipsoid, non-geometric, and so forth. In other words, the image completer 116 may be configured as a fully convolutional end-to-end neural network that takes as input a holey image (having one or more holes) and outputs a filled digital image (where each of the holes is filled with content determined by the image completer 116).

To provide the client device 104 with the application 112 having the image completer 116, the service provider system 102 may leverage the image completer generation system 106. Although functionality of the image completer generation system 106 is illustrated as separate from the service provider system 102, this functionality may also be incorporated as part of the service provider system 102, further divided among other entities, and so forth. Additionally or alternately, an entirety or portions of the functionality of the image completer generation system 106 may be incorporated as part of the client device 104. The image completer generation system 106 includes a training manager module 128 that is implemented at least partially in hardware of a computing device, in part, to deploy deep learning to generate image completers 130, which are illustrated in storage 132. The image completer 116, for instance, may correspond to one of the image completers 130 generated using functionality of the training manager module 128.

To generate the image completers 130, the training manager module 128 is configured to train and combine content generation network 134 and content discrimination network 136. In general, the content generation network 134 represents functionality to generate proposed content for filling a hole of a holey image. In contrast, the content discrimination network 136 represents functionality to detect whether an image and/or portions of an image correspond to computer-generated image content or real content captured with an image-sensing device, e.g., a camera.

In operation, the content generation network 134 generates proposed digital content for filling holes of holey images and the content discrimination network 136 attempts to detect whether the proposed content is computer-generated or not. Responsive to a determination by the content discrimination network 136 that the proposed content is computer-generated, the content generation network 134 updates the proposed content to be more photo-realistic, e.g., consistent with remaining content of the holey image proximate a boundary of the hole, semantically reasonable, visually pleasant, and so forth. This loop between the content generation network 134 and the content discrimination network 136 continues until the content discrimination network 136 indicates that the content generated by the content generation network 134 does not appear to be computer-generated. Alternately or in addition, this loop may continue until the content discrimination network 136 cannot detect that the content generated by the content generation network 134 is computer generated.

With regard to network architecture, the training manager module 128 is capable of generating the content generation network 134 and content discrimination network 136 to form the image completers 130, such that they have a fully convolutional encoder-decoder network framework with dilated convolution in four intermediate layers. The training manager module 128 is also configured to remove batch layers from the framework and leverage exponential linear unit (ELU) as an activation function for the networks. In contrast to conventional techniques, the training manager module 128 configures the output layer of the networks so that sigmoid and tan h are not used. Instead, the training manager module 128 configures the output layer to employ a clip operation. In one or more implementations, the training manger module 128 configures the output layer to employ the clip operation x=clip(x, −1,1). By employing this clip operation, the training manger module 128 restricts the values output by the output layer inside [−1,1].

The image completer generation system 106 provides a variety of advantages by combining the content generation network 134 and content discrimination network 136 to form the image completers 130 in this way. By way of example, the image completer generation system 106 reduces an amount of time it takes to train an image completer from months using conventional techniques to days with the described techniques. The image completer generation system 106 also uses fewer hardware resources than conventional techniques to train the networks, e.g., eight graphics processing units (GPUs) versus one GPU. The described image completer generation system 106 is thus more efficient than conventional systems that generate image completers. Additionally, the image completers 130 complete holey images without utilizing post-processing techniques, e.g., color adjustment. Image completers configured according to the described techniques thus do not place the further burden on computing device resources of carrying out postprocessing techniques during operation.

Having considered an example environment, consider now a discussion of some example details of the techniques for digital image completion using deep learning in a digital medium environment in accordance with one or more implementations.

Digital Image Completion Using Deep Learning

Figure 2:
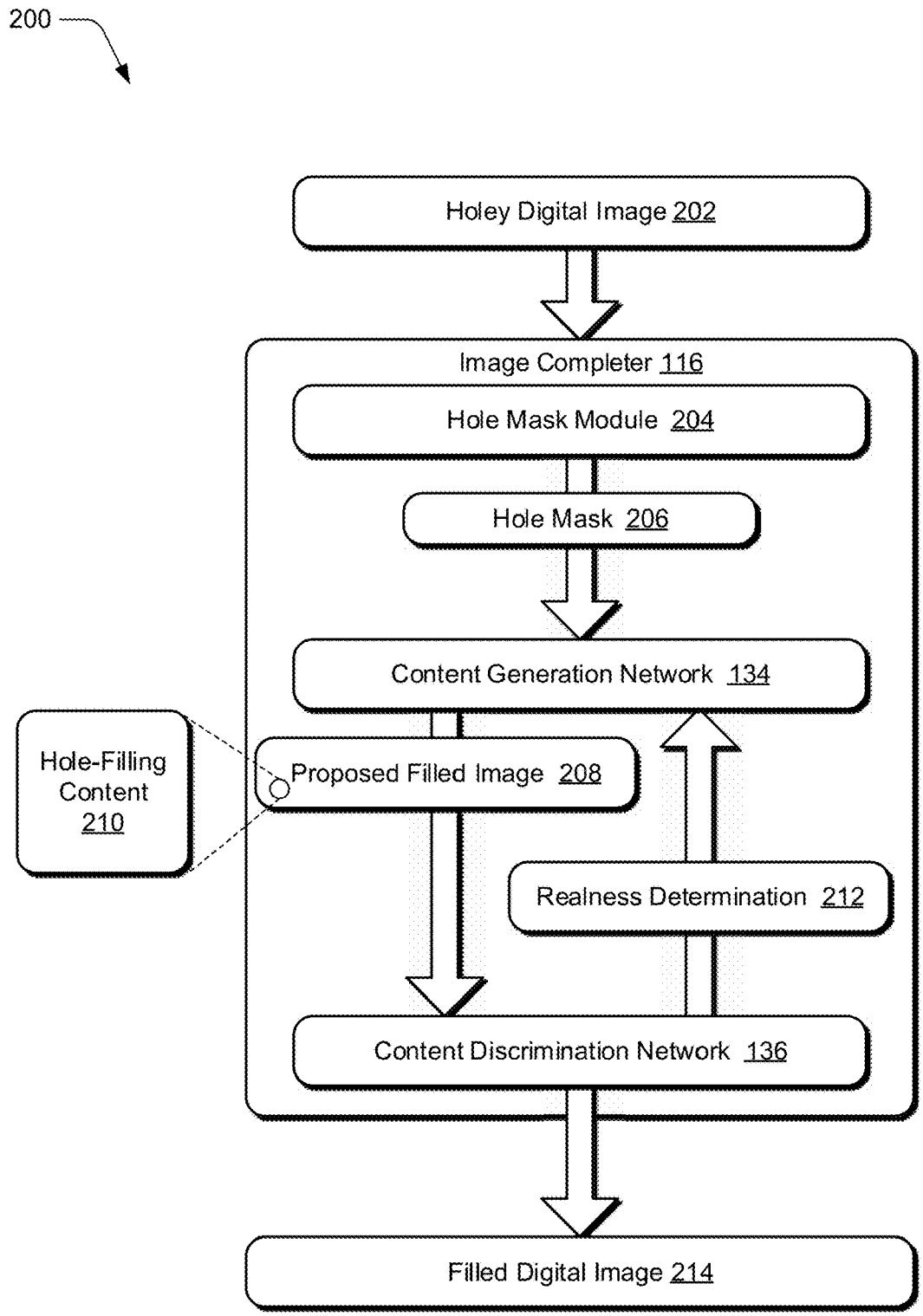
FIG. 2 depicts an example implementation in which an image completion system generates a filled digital image from a holey digital image using a framework that combines a content generation network and a discrimination network.

FIG. 2 depicts a system 200 in an example implementation in which an image completion system generates a filled digital image from a holey digital image using a framework that combines a content generation network and a discrimination network. In the illustrated example, the image completer 116 of FIG. 1 is illustrated in more detail and serves as at least a portion of the image completion system. The image completer 116 is further depicted including the content generation network 134 and content discrimination network 136. As indicated above, the training manager module 128 forms the image completer 116 as a combination of these networks.

In this example 200, the image completer 116 is shown obtaining holey digital image 202. The holey digital image 202 may include one or more holes in depicted digital content, which have any of a variety of shapes. These holes may be present in the holey digital image 202 due to a variety of content removal operations, as discussed above. The image completer 116 is also depicted having hole mask module 204, which represents functionality to generate hole mask 206. Broadly speaking, the hole mask 206 is indicative of the holes in the holey digital image 202. By way of example, the hole mask 206 may be configured to include a value for each pixel of the holey digital image 202 that indicates whether the pixel corresponds to a hole or not. For instance, the hole mask 206 may include a value of '1' for pixels that correspond to remaining depicted content of the holey digital image 202 and a value of '0' for pixels that correspond to a hole of the holey digital image 202. Alternately, the hole mask 206 may include a value of '0' for pixels that correspond to remaining depicted content of the holey digital image 202 and a value of '1' for pixels that correspond to a hole of the holey digital image 202. The hole mask 206 may indicate the holes of the holey digital image 202 in different ways without departing from the spirit or scope of the techniques described herein.

In any case, the combined networks—the content generation network 134 and the content discrimination network 136—receive the holey digital image 202 and the hole mask 206 as input. Initially, the content generation network 134 generates a proposed filled image 208 from the holey digital image 202 and the hole mask 206. The proposed filled image 208 includes hole-filling content 210. The hole-filling content 210 corresponds to the holes of the holey digital image 202. In particular, the hole-filling content 210 of a particular hole corresponds to pixels for which the content generation network 134 modifies values from being indicative of empty and/or removed content to being indicative of determined content. In particular, the content generation network 134 determines this content based on depicted-content characteristics learned during training from training images and pixel values corresponding to remaining pixels of the holey digital image 202.

During training, the content discrimination network 136 receives the proposed filled image 208 and the hole-filling content 210. In one or more implementations, the content discrimination network 136 receives the hole-filling content 210 for a hole as a patch. Alternately or in addition, the content discrimination network 136 may determine the hole-filling content 210 by comparing the proposed filled image 208 to the hole mask 206. In accordance with the described techniques, the content discrimination network 136 determines whether the proposed filled image 208 and the hole-filling content 210 correspond to computer-generated digital content or not. Realness determination 212 comprises data indicative of the content discrimination network 136's determination. For instance, the realness determination 212 may be indicative of the content discrimination network 136 determining that at least one of the proposed filled image 208 or the hole-filling content 210 is computer-generated. Depending on the proposed filled image 208 provided, the realness determination 212 may be indicative of the content determination network 136 determining that the proposed filled image 208 and the hole-filling content 210 do not correspond to computer-generated digital content.

In instances where the realness determination 212 indicates that at least one of the proposed filled image 208 or the hole-filling content 210 appears to be computer generated, the content generation network 134 updates the proposed filled image 208. In particular, the content generation network 134 utilizes the previously proposed filled image and feedback from the content discrimination network 136 to generate a new proposed filled image—to make the new proposed filled image more photo-realistic than the previously proposed filled image. This new proposed filled image includes updated hole-filling content and is provided to the content discrimination network 136. Like with the initially proposed filled image 208, the content discrimination network 136 determines whether the new proposed filled image and the updated-hole filling content correspond to computer-generated digital content or not. Data indicative of this realness determination is also generated, e.g., similar to the realness determination 212.

This interaction between the content generation network 134 and the content discrimination network 136 continues during training until the content discrimination network 136 determines that the proposed filled image 208 and the hole-filling content 210 do not correspond to computer-generated digital content. Such a determination may indicate that the content discrimination network 136 cannot detect whether the proposed filled image 208 and the hole-filling content 210 are computer-generated. Alternately or in addition, this may indicate that the content discrimination network 136 determines the proposed filled image 208 and the hole-filling content 210 imitate photo-realistic digital content to a suitable degree, e.g., by determining a photo-realism score that surpasses a threshold indicating the generated content is suitable to pass as photo-realistic digital content to a viewing client device user.

Based on a determination that the proposed filled image 208 and the hole-filling content 210 do not correspond to computer-generated content, the image completer 116 outputs the proposed filled image 208 with the hole-filling content 210 as the filled digital image 214. The manner in which the content generation network 134 and the content discrimination network 136 interact during training enables the image completer 116 to output the filled digital image 214 without post-processing, e.g., blending, color adjusting, and so forth. In other words, the hole-filling content 210—as generated through the interactions of the content generation network 134 and the content discrimination network 136 is not post-processed for incorporation with the content of the holey digital 202 image to produce the filled digital image 214. In operation, the content generation network 134 can simply output the proposed filled image 208 with the hole filling content 210 as the filled digital image 214, e.g., without feedback from the content discrimination network 136 and without post-processing. This is because the content generation network 134 learns, through the iterative training process involving the content discrimination network 136, weights for its layers to produce photo-realistic fill content (and thus a filled image) given a holey image. In this context, consider FIG. 3.

Figure 3:
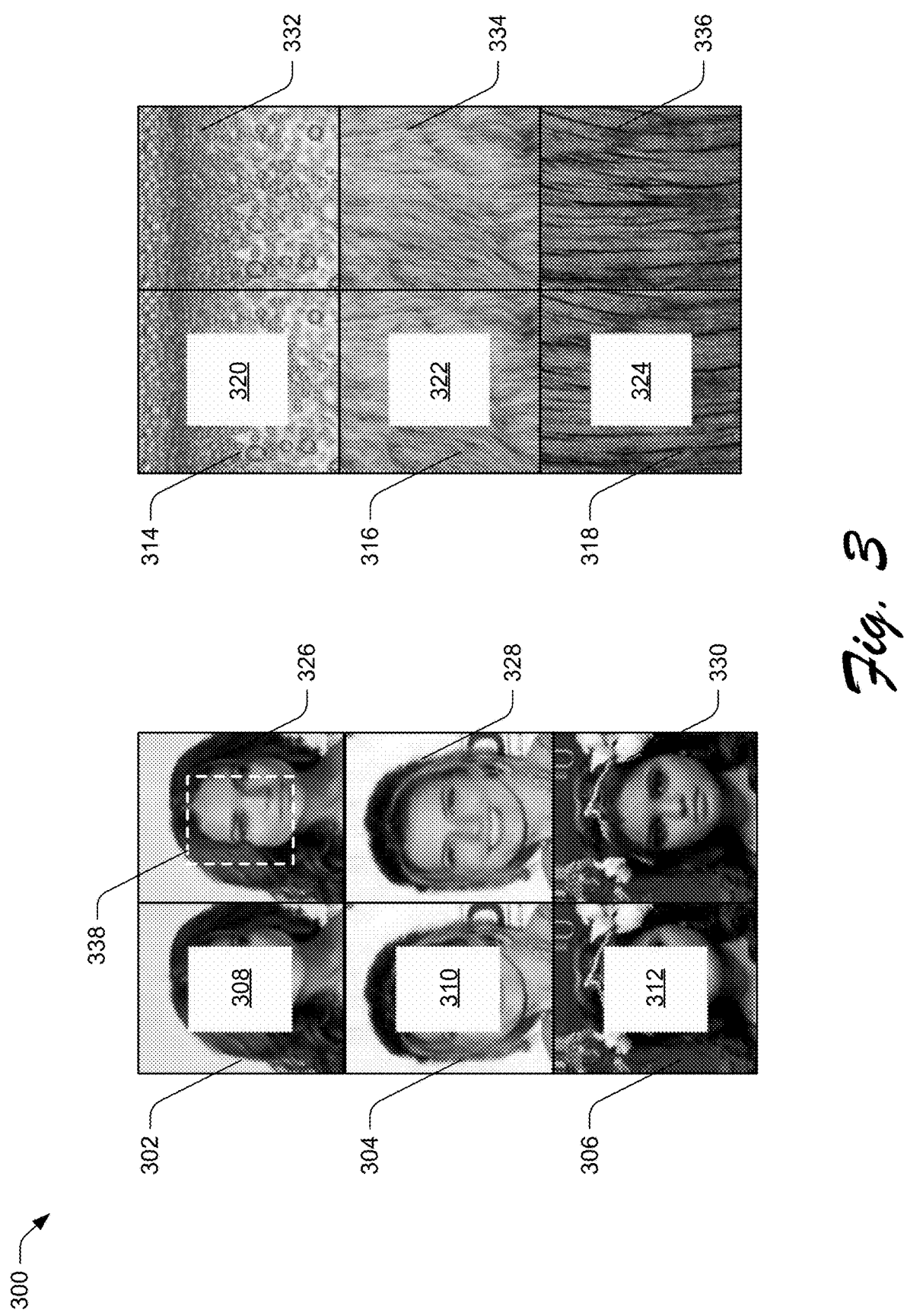
FIG. 3 depicts an example of holey images and corresponding filled digital images generated using a framework that combines a content generation network and content discrimination network.

FIG. 3 depicts an example 300 of holey images and corresponding filled images generated using a framework that combines a content generation network and a content discrimination network.

In particular, the illustrated example 300 includes holey face images 302, 304, 306 having holes 308, 310, 312 and holey pattern images 314, 316, 318 having holes 320, 322, 324. The illustrated example 300 also includes filled face images 326, 328, 330 and filled pattern images 332, 334, 336. In accordance with the described techniques, the image completer 116, formed in part as a combination of the content generation network 134 and the content discrimination network 136, is configured to generate these filled images from the holey images.

Given the holey face image 302, for instance, the image completer 116 employs the hole mask module 204 to produce the hole mask 206 indicative of the hole 308. The image completer 116 then provides the holey face image 302 and the corresponding hole mask 206 as input to the combined framework, e.g., with the content generation network 134 and the content discrimination network 136. Given this input, the combined framework operates as described above and below to output the filled face image 326. The filled face image 326 includes hole-filling content 338. Though not labeled with reference numbers, the other filled images of the illustrated example 300 are also depicted with respective hole-filling content. The hole-filling content 338 is generated by the image completer 116 to fill the hole 308 in a manner that is is consistent with depicted content of the holey face image 302 proximate a boundary of the hole 308, semantically reasonable, and visually pleasant. In accordance with the described techniques, consider an example implementation of the combined framework.

Figure 4:
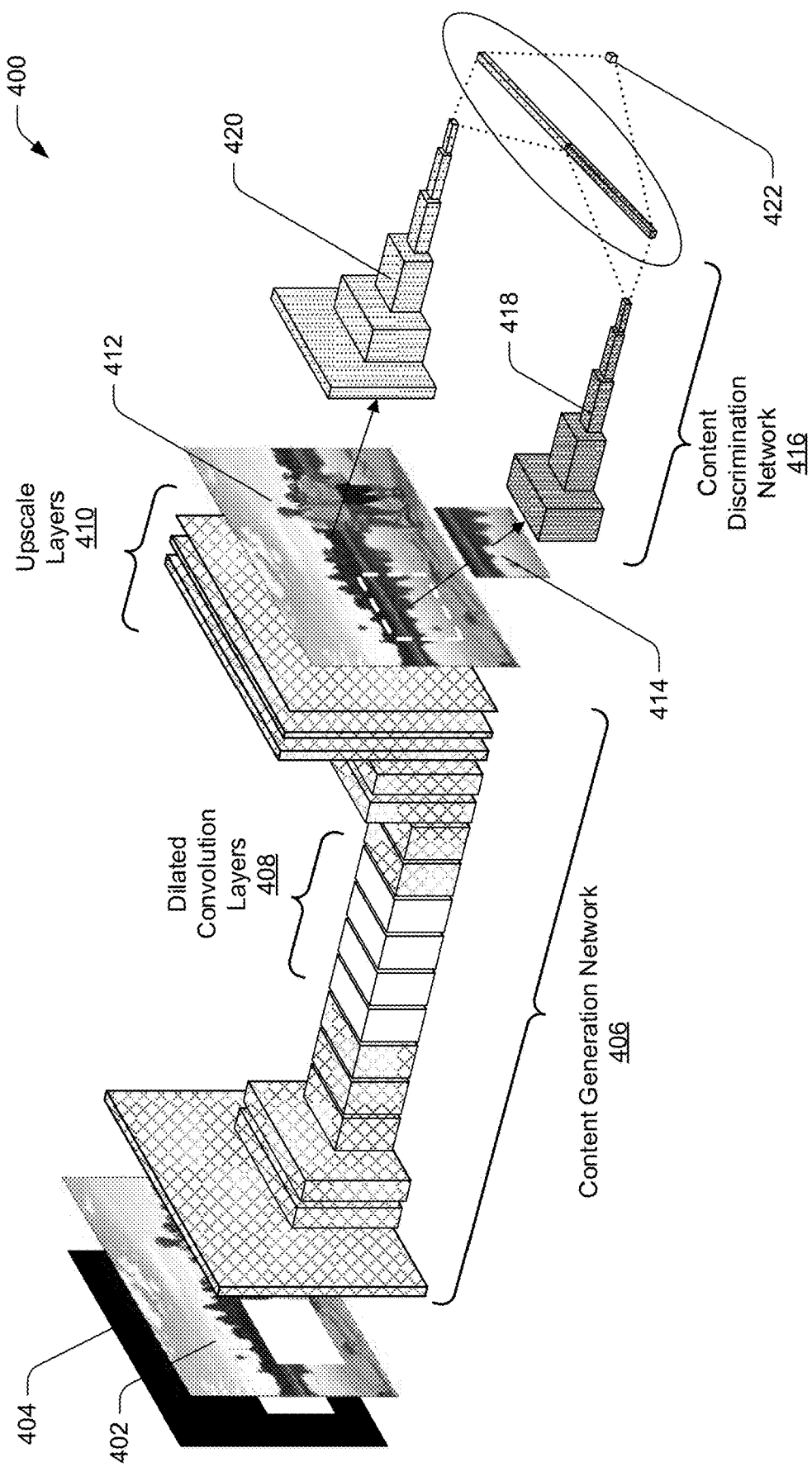
FIG. 4 depicts an example implementation of an image completion framework formed by combining a content generation and content discrimination networks with deep learning.

FIG. 4 depicts an example 400 of an implementation of an image completion framework formed by combining a content generation and content discrimination networks with deep learning. In accordance with the described techniques, the illustrated example 400 depicts a fully convolutional encoder-decoder network framework with dilated convolution.

The illustrated example 400 includes input holey image 402 and hole mask 404, which is indicative of holes in depicted content of the holey image 402. The holey image 402 and the hole mask 404 serve as input to content generation network 406. In one or more implementations, the content generation network 134 is configured as and thus corresponds to the content generation network 406. The illustrated content generation network 406 includes intermediate dilated convolution layers 408. In one or more implementations, the content generation network 406 includes four such dilated convolution layers 408. In contrast to conventional network frameworks, the framework of the illustrated example 400 does not include batch normalization layers. Upscale layers 410 are also depicted. In one or more implementations, the upscale layers 410 represent functionality to perform resize operations and an additional convolution operation after the dilated convolution layers 408.

Further, the illustrated example 400 depicts proposed filled image 412 and hole-filling content 414. The proposed filled image 412 corresponds to output of the content generation network 406. In contrast to conventional techniques, the content generation network 406 does not use sigmoid or tank at the output layer. Instead, the content generation network 406's output layer employs a clip operation. In one or more implementations, the output layer is configured to employ the clip operation x=clip (x, −1,1). By employing this clip operation, the values output by the output layer are restricted inside [−1,1]. Configuring the framework in this way enables the content generation network 406 to generate hole-filling content 414 that is more photo-realistic than conventional techniques and also does so more efficiently, e.g., in less time and using fewer resources.

The illustrated example 400 also includes content discrimination network 416, which includes local discriminator 418 and global discriminator 420. In one or more implementations, the content discrimination network 136 is configured as and thus corresponds to the content discrimination network 416. These discriminators are configured as separate convolutional neural networks with weight balance of adversarial loss. In general, the content discrimination network 416 represents functionality to determine whether the proposed filled image 412 and the hole-filling content 414 correspond to computer-generated content or not. In particular, the local discriminator 418 represents functionality to determine whether the hole-filling content 414 corresponds to computer-generated content or not. In contrast, the global discriminator 420 represents functionality to determine whether the proposed filled image 412 includes computer-generated content or not. The content discrimination network 416 uses fully connected layers at the end of the local and global discriminators 418, 420.

The illustrated example 400 also includes realness determination 422. The realness determination 422 is produced as the output of the local and global discriminators 418, 420 and indicates whether the proposed filled image 412 includes computer-generated imagery or not. In one or more implementations, the realness determination 212 corresponds to the realness determination 422. In one or more implementations, the training manager module 128 generates and trains the framework of the illustrated example 400 as follows.

In accordance with the described techniques, the training manager module 128 generates the content generation network 406 to use exponential linear unit (ELU) as an activation function. Rather than training the framework with a simple Generative Adversarial Nets (GAN) loss function, the training manager module 128 trains the framework with a modified GAN loss function. In at least some implementations, the training manager module 128 trains the framework with a modified Wasserstein GAN (WGAN) function. By way of example, the training manager module 128 trains the framework based on the following modified WGAN function:

$$\min_G \max_{D \sim \mathcal{D}} \mathbb{E}_{x \sim \mathbb{P}_r}[D(x)] - \mathbb{E}_{\tilde{x} \sim \mathbb{P}_g}[D(\tilde{x})]$$

Here, the term x represents ground truth patches randomly removed by the training manager module 128 from training images to produce holes in the training images. The term $\tilde{x}$ represents patches generated by the framework as part of the training. Given these patches, the training manager module 128 can compare the ground truth patches to the generated patches to refine the networks, e.g., the content generation network 406 and the global- and local-branches of the content discrimination network 416.

With reference again to the modified WGAN function, the term $\mathcal{D}$ represents a set of 1-Lipschitz functions. In general, a function $f$ that is defined as "Lipschitz" maps real-number variables to real numbers as output. Given possible variables A for the function $f$, for instance, the values of the variables A are a subset of any real numbers such that $A \subset \mathbb{R}^n$, where $\mathbb{R}^n$ is the set of any real number. Further, the function $f$ maps the variables A to real numbers as output such that $f: A \to \mathbb{R}^m$, where $\mathbb{R}^m$ is a set of mapped real numbers. The function $f$ is considered "L-Lipschitz," where the value of L is greater than or equal to zero, if the following is true for each pair of points in the set of variables A:

$$|f(a)-f(b)| \leq L|a-b|$$

Here, the terms a and b represent different points from the set of variables A such that a, b∈ A. Referring again to the modified WGAN function, which the training manager module 128 uses to train the framework, the term $\mathbb{P}_g$ represents a distribution of the content generation network 406. The modified WGAN function is obtained by forming the function according to Kantorovich-Rubenstein duality. In connection with scenarios where the training manager module 128 leverages the modified WGAN function, the training manager module 128 also uses a gradient penalty for the training. In one or more implementations, the training manager module 128 uses the following gradient penalty function with the noted-modified WGAN function:

$$\lambda \mathbb{E}_{\hat{x} \sim \mathbb{P}_{\hat{x}}}[(\|\nabla_D D(\hat{x})\lambda - 1)^2]$$

Here, the term λ represents a weighting hyper-parameter. Broadly speaking, the term $\hat{x}$ represents a uniform interpolation between the ground truth patches x and the patches $\tilde{x}$ generated by the framework during training. In one or more implementations, the training manager module 128 determines the uniform interpolation $\hat{x}$ according to the following:

$$\hat{x} = \in x + (1-\in)\tilde{x}$$

As used during training, the ground truth patches x have a distribution $\mathbb{P}_r$ and the generated patches $\tilde{x}$ have the distribution $\mathbb{P}_g$, such that $x \sim \mathbb{P}_r$ and $\tilde{x} \sim \mathbb{P}_g$. Further, the term ∈ represents values uniformly distributed between and including zero and one, such that ∈~U[0,1].

To train the content discrimination network 416 the training manager module 128 uses one or more loss functions. By way of example, the training manager module 128 trains the local discriminator 418 with a local loss function and trains the global discriminator 420 with a global loss function. In one or more implementations, the training manager module 128 trains the local discriminator 418 in accordance with the following local loss function:

$$L_{adversarial\_local\_loss} = \min_G -\mathbb{E}_{\tilde{x}_{patch} \sim \mathbb{P}_g}[D(\tilde{x}_{patch})]$$

Here, the term $L_{adversarial\_local\_loss}$ represents a loss computed in connection with a patch $\tilde{x}_{patch}$ generated during training as the hole-filling content 414. In contrast, the term $L_{adversarial\_global\_loss}$ represents a loss computed in connection with the patch $\tilde{x}_{patch}$ as incorporated in the proposed filled image 412. In one or more implementations, the training manager module 128 trains the global discriminator 420 in accordance with the following global loss function:

$$L_{adversarial\_global\_loss} = \min_G -\mathbb{E}_{\tilde{x}_{patch} \sim \mathbb{P}_g}[D(\tilde{x}_{patch})]$$

The training manager module 128 is further capable of training the framework using additional loss functions in accordance with the principles described herein. By way of example, the training manager module 128 can train the framework using a loss function that accounts for differences in a difficulty of determining values for pixels proximate a border of a hole and values for pixels proximate a center of the hole. In this context, consider FIG. 5.

Figure 5:
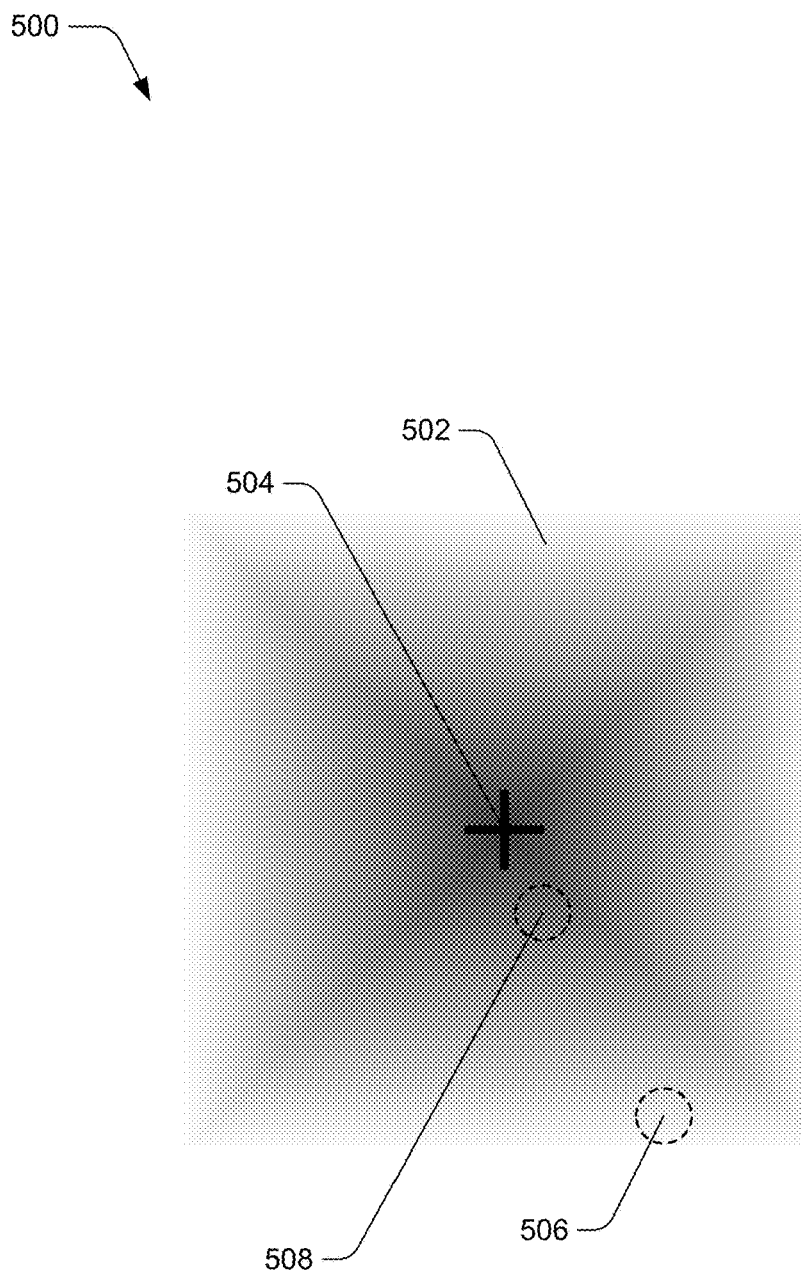
FIG. 5 depicts an example implementation of a mask that is used in connection with filling a hole of a holey image and is indicative of a number of possible solutions for different pixels of the hole.

FIG. 5 depicts an example 500 of an implementation in which a mask used in connection with filling a hole of a holey image is indicative of a number of possible solutions for different pixels of the hole. In particular, the illustrated example 500 includes mask 502.

Broadly speaking, the illustrated mask 502 is filled with a gradient filling that is lighter toward the outside of the mask 502 and darker near a center of the mask 502. This gradient filling represents, generally, that it is easier for the framework of the illustrated example 400 to predict pixels near a boundary of a hole than pixels near a center of the hole. This is because there is more available information for predicting pixels nearer a boundary of a hole. By way of example, the pixels of a hole that are closer to the boundary are also closer to remaining imagery of a holey image than pixels closer to a center of the hole. The information of these remaining-imagery pixels (e.g., color values) can thus be used to a greater extent to predict the hole pixels near the boundary than to predict the holes near the center of the hole. To predict the holes near the center, more information from predicted pixels may be used than information from remaining-imagery pixels.

Accordingly, the gradient of the illustrated mask 502 indicates the assignment of labels to pixels of a hole. In this case, the mask 502 and thus the hole to which the mask 502 corresponds is square. However, the mask 502 may have a different shape based on a shape of the hole being filled. In any case, the mask 502 indicates that pixels nearer a boundary of a hole are labeled with a label that corresponds to lower variance. In the context of the illustrated example 500, pixels near hole boundaries are labeled with higher loss weights, which is represented as white color. Similarly, pixels near a hole center are labeled with lower loss weights, which is represented as a black color.

The illustrated example 500 also includes center indication 504, near hole-boundary pixels 506, and near hole-center pixels 508. The center indication 504 represents a center of a hole to which the mask 502 corresponds. The near hole-boundary pixels 506 represent one or more pixels that are nearer to a boundary of the hole to which the mask 502 corresponds than the near hole-center pixels 508. Likewise, the near hole-center pixels 508 represent one or more pixels that are nearer to a center of the hole (as indicated by the center indication 504) to which the mask 502 corresponds than the near hole-boundary pixels 506. Broadly speaking, the near hole-center pixels 508 are illustrated darker than the near hole-boundary pixels 506. This indicates that the near hole-center pixels 508 are labeled with lower loss weights than the near hole-boundary pixels 506. The lighter illustration of the near hole-boundary pixels 506 indicates that these pixels are labeled with higher loss weights than the near hole-center pixels 508.

In one or more implementations, the training manager module 128 labels the pixels of a hole of a training image with loss weights on a per pixel basis—in other words, on a "pixelwise" basis. For instance, the training manager module 128 may use a pixelwise $l_1$ or $l_2$ loss to determine weights for labelling the pixels indicated by the mask 502. The training manager module 128 may also stabilize training of the networks with GAN loss by adjusting an entirety of the proposed filled image 412 with an auto-encoder loss. In one or more implementations, the training manager module 128 computes this auto-encoder loss as a function of an image predicted by the framework during training, e.g., the proposed filled image 412. In the following discussion, the image predicted during training is represented by the term $I_P$. This auto-encoder loss is also a function of an original image, to which the training manager module 128 introduces holes for the purpose of training and to which the predicted image can be compared. In the following discussion, the original image is represented by the term $I_O$. By way of example, the training manager module 128 may compute an auto-encoder loss over the entirety of an image according to the following:

$$L_{image\_ae\_loss} = \text{mean}(|I_O - I_P|)$$

The term $L_{image\_ae\_loss}$ corresponds to the auto-encoder loss computed by the training manager module 128. During training, the training manager module 128 is also configured to compute an auto-encoder loss for the local patch predicted by the framework, e.g., the hole-filling content 414. The training manager module 128 computes this auto-encoder loss as a function of the patch predicted by the framework during training, e.g., the hole-filling content 414. In the following discussion, the patch predicted during training is represented by the term $H_P$. This auto-encoder loss is also a function of an original patch, which the training manager module 128 removes from an image to introduce a hole for training. The training manager module 128 is further configured to compare the original patch with the predicted patch. In the following discussion, the original patch is represented by the term $H_O$. By way of example, the training manager module 128 may compute an auto-encoder loss for a patch generated to fill a hole of an image according to the following:

$$L_{patch\_ae\_loss} = \text{mean}(|H_O - H_P|)$$

The term $L_{patch\_ae\_loss}$ corresponds to the auto-encoder loss computed by the training manager module 128 for patches. Given these losses, the training manager module 128 can train the framework according to an object function that combines the losses—the auto-encoder loss for entire images, the auto-encoder loss for the patches, the adversarial local loss (for the patches), and the adversarial loss (for the entire images). In one or more implementations, the training manager module 128 trains the framework according to the following objective function:

$$L_{overall} = W_1 L_{image\_ae\_loss} + W_2 L_{patch\_ae\_loss} + W_3 L_{adversarial\_local\_loss} + W_4 L_{adversarial\_global\_loss}$$

Here, the term $L_{overall}$ represents the overall loss computed by the training manager module 128. The terms $W_1$, $W_2$, $W_3$, $W_4$ represent weights learned by the convolutional neural network framework due to the training. Broadly speaking, the training involves the training manager module 128 exposing the framework to sets of images, e.g., one or more image sets depicting people, one or more image sets depicting scenes in nature, one or more image sets of patterns, and so on. As part of this, the training manager module 128 removes portions of these training images to introduce holes into the images. The training manager module 128 maintains these removed portions ("ground truth patches") for comparison with the patches generated by the framework during training. Based on comparisons of the ground truth patches with the patches generated during training, the training manager module 128 can refine the digital content comprising the neural network to produce patches that more closely resemble the removed portions.

It should be appreciated that the training manager module 128 may train the framework using a variety of categories of images without departing from the spirit or scope of the techniques described herein. The training manager module 128 may also use different loss functions and combine the loss functions differently than described above without departing from the spirit or scope of the techniques described herein. Once trained, though, the framework can be leveraged by the image completers 130 to complete holey images as described above. In this context, consider the following example use of the framework.

Figure 6:
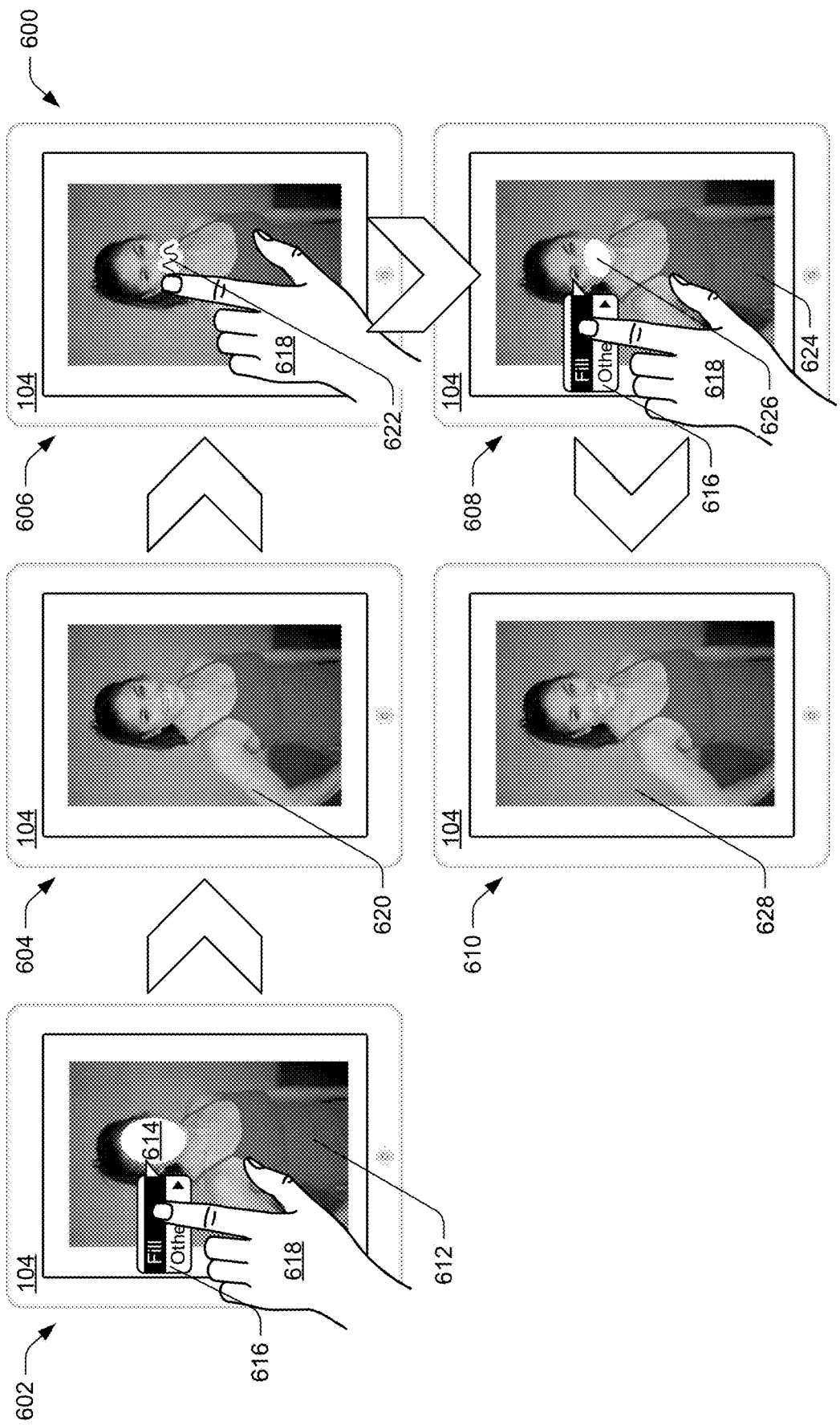
FIG. 6 depicts an example implementation of sequential hole filling in which a holey image is filled with generated digital content, a portion of the generated content is removed, and a new hole resulting from the removal is filled with additional generated digital content.

FIG. 6 depicts an example implementation 600 of sequential hole filling in which a holey image is filled with generated digital content, a portion of the generated content is removed, and a new hole resulting from the removal is filled with additional generated digital content.

The illustrated example 600 includes the client device 104 of FIG. 1. The client device 104 is depicted in different stages of the example sequential hole filling. Depending on a number of times a user selects to have holes filled, there may be a different number of stages than illustrated. Additionally, different user interface instrumentalities may be leveraged without departing from the spirit or scope of the described techniques. In any case, the illustrated example 600 depicts the client device 104 in five different stages, including first stage 602, second stage 604, third stage 606, fourth stage 608, and fifth stage 610.

In the first stage 602, the client device 104 is depicted displaying holey digital image 612 having hole 614. This hole 614 may be introduced to produce the holey digital image 612 based on a variety of editing operations, such as receiving user input to select and remove a face of the depicted person. The hole 614 may be introduced by other operations without departing from the spirit or scope of the techniques described herein. Regardless, the client device 104 is also depicted displaying user interface instrumentality 616 proximate the hole 614. The user interface instrumentality 616 is depicted having a "fill" option, which, when selected is configured to initiate filling of the hole 614 in accordance with the described techniques. In the first stage 602, a hand 618 of a user of the client device 104 is depicted selecting the fill option of the user interface instrumentality 616. Responsive to such a selection, the image completer 116 is configured to fill the hole 614 in substantially real-time as described in more detail above. For instance, responsive to such a selection, the image completer 116 obtains the holey digital image 612 as the holey digital image 202 depicted in FIG. 2.

In the second stage 604, the client device 104 is depicted displaying first filled digital image 620. Broadly speaking, the first filled digital image 620 corresponds to the output of the image completer 116, e.g., the output of the framework illustrated in the example 400. In the first filled digital image 620, the hole 626 is filled with digital content generated by the image completer 116. In some scenarios, a user may not be satisfied with the filled images that are output by the image completer 116. In these scenarios, a user may select portions to remove and then select to have the removed portions filled. In this context, consider the third stage 606. In the third stage 606, the hand 618 of the user is depicted providing a scribble touch-input 622 over a mouth area of the person depicted in the first filled digital image 620. This scribble touch-input 622 can serve as basis for selecting the mouth area, which the user can then select to remove, e.g., via other user interface instrumentalities (not shown) of the application 112.

The fourth stage 608 represents a scenario in which the user has selected to remove the mouth area from the person depicted in the first filled digital image 620. Based on removal of the mouth area, the application 112 updates the first filled digital image 620 to produce a second holey digital image 624 having hole 626—introduced as a result of removing the mouth area. In the fourth stage 608, the client device 104 is depicted displaying the second holey digital image 624. The client device 104 is also depicted displaying the user interface instrumentality 616 again proximate the hole 626. In the fourth stage 608, the hand 618 of the user of the client device 104 is depicted selecting the fill option of the user interface instrumentality 616. Responsive to such a selection, the image completer 116 is configured to fill the hole 626. Responsive to this selection, for instance, the image completer 116 obtains the second holey digital image 624 as the holey digital image 202 depicted in FIG. 2.

In the fifth stage 610, the client device 104 is depicted displaying second filled digital image 628. The second filled digital image 628 also corresponds to the output of the image completer 116, e.g., the output of the framework illustrated in the example 400. In the second filled digital image 628, the hole 626 is filled with digital content generated by the image completer 116. Accordingly, filled portions of images generated by an image completer may be selected and filled sequentially until an image having suitable generated fill content is obtained. This may involve any number of iterations. Indeed, there may be more iterations than the two depicted in the illustrated example 600.

Having discussed example details of the techniques for digital image completion using deep learning, consider now some example procedures to illustrate additional aspects of the techniques.

Example Procedures

This section describes example procedures for digital image completion using deep learning in a digital medium environment in one or more implementations. Aspects of the procedures may be implemented in hardware, firmware, or software, or a combination thereof. The procedures are shown as a set of blocks that specify operations performed by one or mare devices and are not necessarily limited to the orders shown for performing the operations by the respective blocks. In at least some implementations, the procedures are performed by a suitably configured device, such as the client device 104 of FIG. 1 that makes use of an image completer 116 or image completer generation system 106 that makes use of the training manager module 128.

Figure 7:
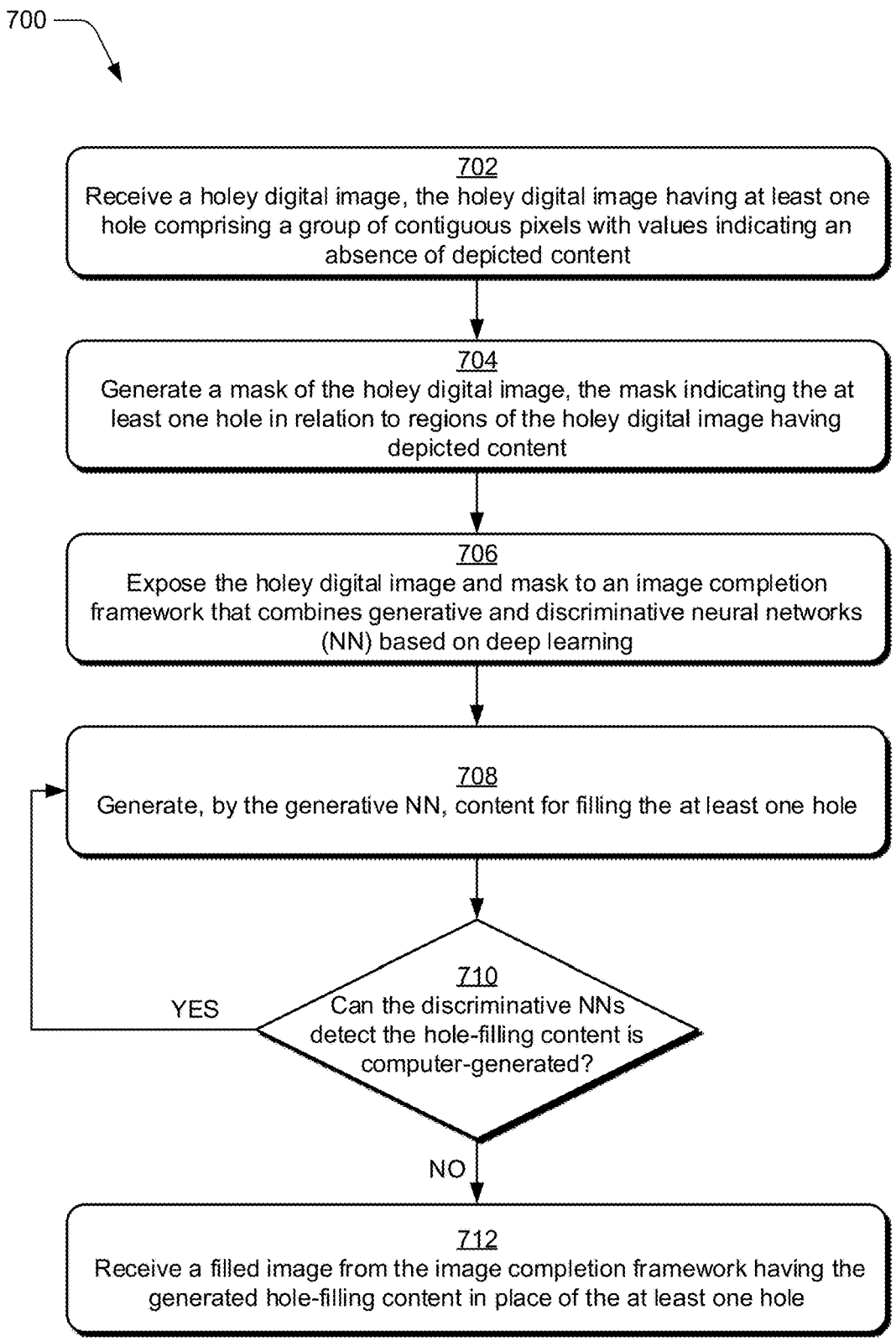
FIG. 7 depicts a procedure in an example implementation in which holes of a holey digital image are filled with image content generated using an image completion framework that combines a content generation network and content discrimination network.

FIG. 7 depicts an example procedure 700 in which holes of a holey digital image are filled with image content generated using an image completion framework that combines a content generation and content discrimination networks.

A holey digital image is received (block 702). In accordance with the principles discussed herein, the holey digital image includes at least one hole comprising a group of contiguous pixels with values indicating an absence of depicted content. By way of example, the image completer 116 obtains the holey image 120 having the hole 122, which comprises a group of contiguous pixels with values that indicate an absence of depicted content. Indeed the hole 122 is depicted as white pixels whereas the rest of the holey image 120 is depicted comprising photo-realistic imagery.

A mask of the holey image is generated (block 704). In accordance with the principles discussed herein, the mask indicates the at least one hole in relation to regions of the holey digital image that have imagery. By way of example, the hole mask module 204 generates the hole mask 206 from the holey image 120. In this scenario, the hole mask 206 is indicative of the hole 122 of the holey image 120.

The holey digital image is exposed to an image completion framework that combines generative and discriminative neural networks (block 706). In accordance with the principles discussed herein, the generative and discriminative neural networks are combined using adversarial deep learning. By way of example, the image completer 116 exposes the holey image 120 along with the mask generated at block 704 to an image completion framework that combines the content generation network 134 and the content discrimination network 136. These networks can be combined by the training manager module 128 as depicted in the illustrated example 400 and using adversarial deep learning.

Content for filling the at least one hole is generated by the generative neural network of the image completion framework (block 708). By way of example, the content generation network 134 generates the hole-filling content 210 to combine with the holey image 120 to produce the proposed filled image 208. A determination is made as to whether the discriminative neural networks detect that the hole-filling content corresponds to computer-generated content (block 710). By way of example, a determination is made as to whether the content discrimination network 136 detects that the hole-filling content 210 corresponds to computer-generated content or not.

If it is determined that the discriminative neural networks detect that the hole-filling content corresponds to computer-generated content (i.e., "Yes" from block 710), then the method returns to block 708. By way of example, if the content discrimination network 136 detects that the hole-filling content 210 corresponds to computer-generated content (as opposed to photo-realistic content captured with an image sensing device), then the method returns to block 708, e.g., the realness determination 212 indicates that the hole-filling content 210 is computer-generated. In this scenario, the content generation network 134 again generates the proposed filled image 208, but with different hole-filling content 210 than during the previous iteration. This iterative process is performed until the content discrimination network 136 does not detect that the hole-filling content 210 is computer-generated, e.g., the realness determination 212 indicates that the hole-filling content 210 is suitably photo-realistic. Alternately or in addition, this iterative process is carried out until detection of the computer-generated content by the content discrimination network 136 surpasses a threshold difficulty, e.g., fails to converge on a determination after a threshold amount of time, threshold number of iterations, and so on. In this context, consider the following.

If, however, it is determined that the discriminative neural networks do not detect that the hole-filling content corresponds to computer-generated content (i.e., "No" from block 710), then a filled image is received from the image completion framework (block 712). In accordance with the principles discussed herein, the filled image received from the image completion framework includes the generated hole-filling content in place of the at least one hole. By way of example, if the content discrimination network 136 does not detect that the hole-filling content 210 is computer-generated, then the image completer 116 outputs the last proposed filled image 208. In this example, the image completer 116 outputs the filled digital image 124, which has the network-generated content 126 to replace the hole 122. The filled digital image 124 is output from the image completer 116 without post-processing the filled digital image 124 as output by the image completion framework. In this way, the image completion framework may be considered end-to-end fully convolutional.

Figure 8:
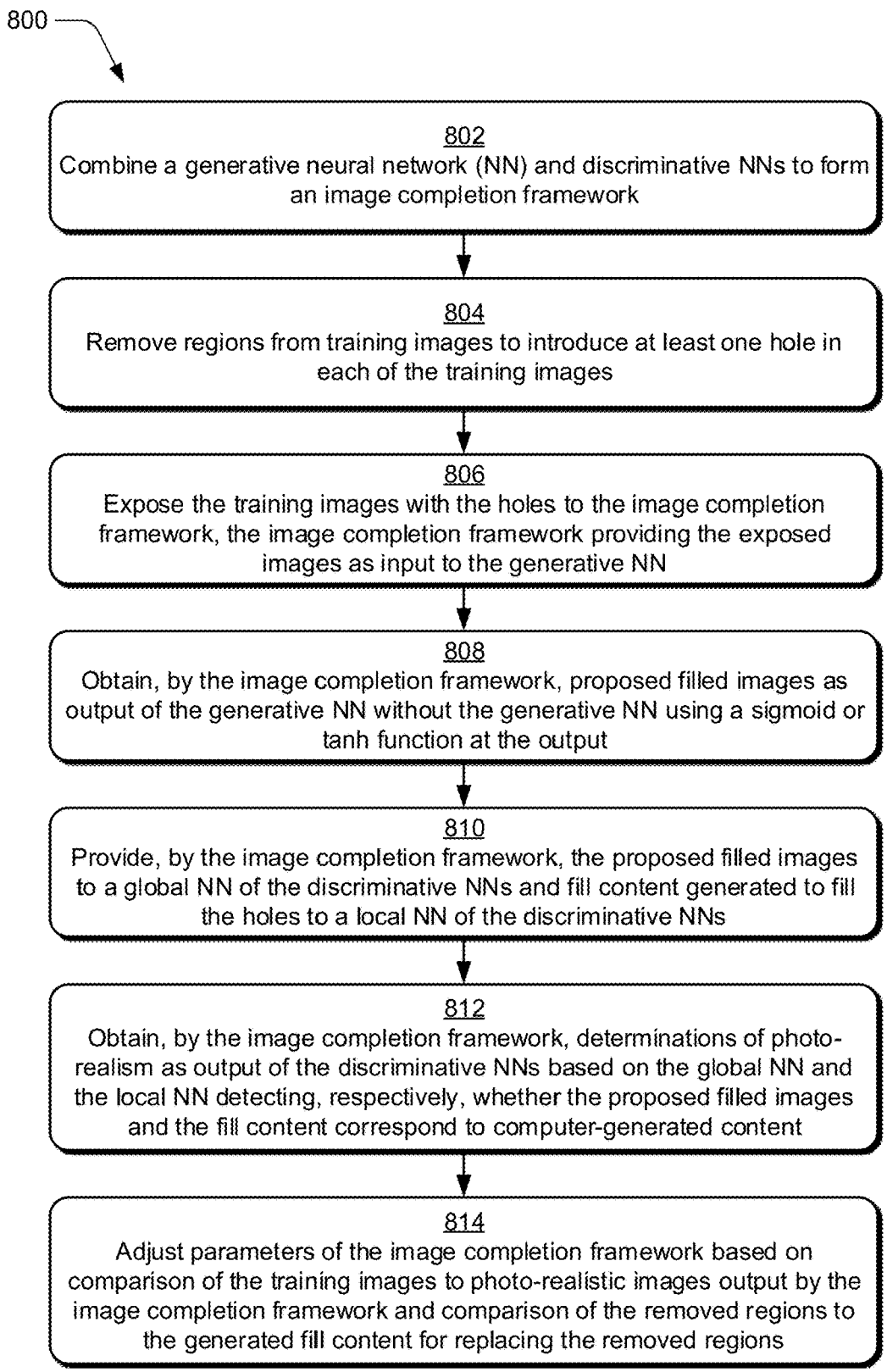
FIG. 8 depicts a procedure in an example implementation in which a network framework is generated to fill holes of holey digital images with boundary consistent, semantically reasonable, and visually pleasant digital content.

FIG. 8 depicts an example procedure 800 in which a network framework is generated using deep learning and to fill holes of holey digital images with boundary consistent, semantically reasonable, and visually pleasant digital content.

A generative neural network is combined with discriminative neural networks to form an image completion framework (block 802). By way of example, the training manager module 128 combines the content generation network 406 and the content discrimination network 416, which includes the local discriminator 418 and the global discriminator 420, to form the image completion framework of the illustrated example 400. Regions are removed from training images to introduce at least one hole in each of the training images (block 804). By way of example, the training manager module 128 removes regions from each image of one or more sets of training images. In one or more implementations, the training manager module 128 removes multiple regions from at least one image. In one or more implementations, each set of training images corresponds to an image type, where the types of images include, by way of example and not limitation, images of people, natural images, and patterned images.

The training images with the holes are exposed to the image completion framework (block 806). In accordance the principles discussed herein, the image completion framework provides the exposed images as input to the generative neural network. By way of example, the training manager module 128 exposes the training images with the regions removed at block 804 to the image completion framework of the illustrated example 400. In so doing, the training manager module 128 initiates training of this framework.

During training, the framework learns to generate content for filling the holes removed from the training images. This learning is based, in part, on an activation function to activate the learning and also by learning weights for an overall objective function. In one or more implementations, the training manager module 128 activates the learning for the framework using exponential linear unit (ELU) as an activation function. Further, the training manager module 128 trains the framework according to a modified Wasserstein Generative Adversarial Nets (WGAN) loss function— as compared to a simple GAN loss function. In one or more implementations, the training manager module 128 removes batch normalization layers from the content generation network 406 and deploys a fully convolutional encoder-decoder network framework with dilated convolution in four intermediate layers.

Proposed filled images are obtained by the image completion framework as output from the generative neural network (block 808). In accordance with the principles discussed herein, the proposed filled images are obtained as output without the generative neural network using a sigmoid or tan h function at the output. By way of example, the training manager module 128 obtains proposed filled images as output from the content generation network 406. The content generation network 406 outputs these proposed filled images without using a sigmoid or tan h function. Instead, the content generation network 406 uses the upscale layers 410 to resize and perform additional convolution operations on the output of the intermediate dilated convolution layers 408.

The proposed filled images are provided by the image completion framework to a global neural network of the discrimination neural networks, and the fill content generated to fill the holes (and produce the filled images) is provided to a local neural network of the discriminative neural networks (block 810). By way of example, the training manager module 128 provides the proposed filled images of block 808 to the global discriminator 420 of the content discrimination network 416. Further, the training manager module 128 provides the fill content, generated to fill the holes of the holey training images, to the local discriminator 418. In one or more implementations, the training manager module 128 configures the global discriminator 420 and the local discriminator 418 as convolutional neural networks.

Determinations are obtained by the image completion framework as to whether the content of the proposed filled images is photo-realistic (block 812). In accordance with the principles discussed herein, these determinations are obtained from the discriminative neural networks. Additionally, these determinations are based on the global neural network detecting whether the proposed filled images correspond to computer-generated content and the local neural network detecting whether the fill content to fill the holes of the training images corresponds to computer generated content. By way of example, the training manager module 128 obtains determinations made by the global discriminator 420 and the local discriminator 418 as to whether the content of the filled images provided at block 810 is photo-realistic. Based on determinations that the filled images are photo-realistic, the framework provides as output the determined photo-realistic images.

Parameters of the image completion framework are adjusted based on a comparison of the training images to determined photo-realistic images output by the image completion framework (block 814). In accordance with the principles discussed herein, the parameters are further adjusted based on comparing the removed regions of the training images and the generated fill content for replacing the removed regions. By way of example, the training manager module 128 compares the images output by the framework as being photo-realistic to the training images. The training manager module 128 also compares the content removed from the training images to the hole-filling content of the determined photo-realistic images. In one or more implementations, the training manager module 128 makes these comparisons using adversarial local and global loss functions as described above. The training manager module 128 also makes these comparisons using an auto-encoder loss as described above. Based on these computed losses, the training manager module 128 adjusts parameters of the framework, such as parameters of the convolution layer. In this way, the framework learns to generate hole-filling content that is boundary consistent, semantically reasonable, and visually pleasant.

Having described example procedures in accordance with one or more implementations, consider now an example system and device that can be utilized to implement the various techniques described herein.

Example System and Device

Figure 9:
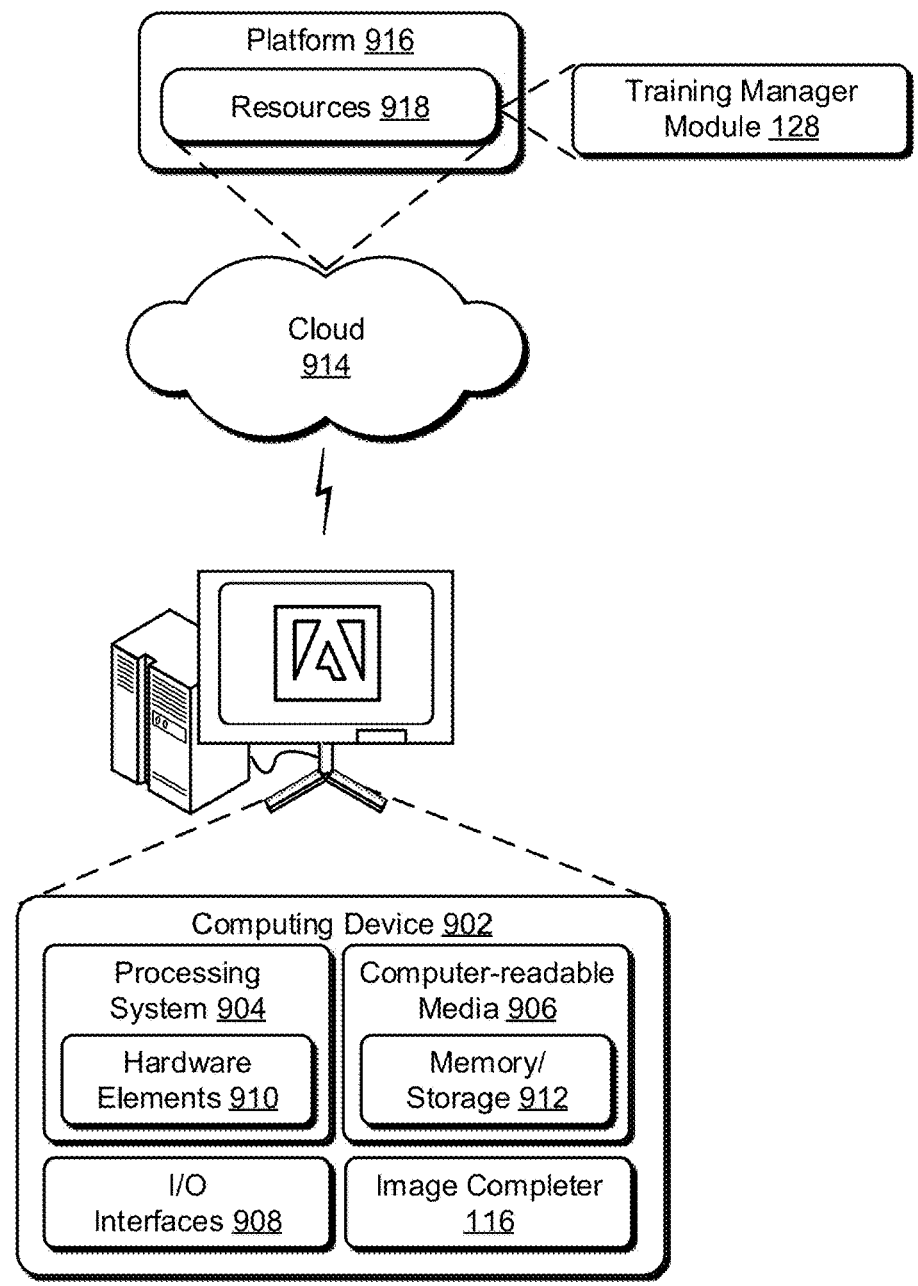
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image completer 116 and the training manager module 128. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera. (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to complete digital images having holes, a method implemented by a computing device, the method comprising:

exposing, by the computing device, a holey digital image to an image completer having a framework that combines generative and discriminative neural networks using adversarial deep learning, the holey digital image having at least one hole comprising a group of contiguous pixels with values indicating an absence of depicted imagery, and the discriminative neural networks including a local discriminator network and a global discriminator network; and receiving, by the computing device, a filled digital image as output from the image completer, the filled digital image including hole-filling digital content in place of the at least one hole, the image completer outputting the filled digital image based on iterations of:

generating proposed hole-filling digital content with the generative neural network based, in part, on the depicted imagery of the holey digital image; and determining with the discriminative neural networks whether the proposed hole-filling digital content is computer-generated digital content based, in part, on determining with the global discriminator network whether a proposed filled digital image including the proposed hole-filling digital content in place of the at least one hole includes computer-generated digital content, the proposed hole-filling digital content used as the hole-filling digital content.

2. A method as described in claim 1, wherein the iterations are discontinued responsive to the discriminative neural networks failing to determine that the proposed hole-filling digital content is computer-generated.

3. A method as described in claim 1, wherein the generative neural network is configured without batch normalization layers.

4. A method as described in claim 1, wherein the generative neural network is configured using exponential linear unit (ELU) as an activation function to activate generating the proposed hole-filling digital content.

5. A method as described in claim 1, wherein the generative neural network comprises a convolutional neural network having:
  intermediate dilation layers for performing one or more convolution operations as part of generating the proposed hole-filling digital content based on the depicted imagery of the holey digital image; and
  upscale layers arranged after the intermediate dilation layers to resize output of the intermediate dilation layers and perform an additional convolution operation on output of the intermediate dilation layers.

6. A method as described in claim 1, wherein generating the proposed hole-filling digital content includes the generative neural network outputting the proposed-hole filling digital content without using sigmoid or tan h at an output layer.

7. A method as described in claim 1, wherein the generative neural network comprises a convolutional neural network having dilated convolution in four intermediate dilation layers.

8. A method as described in claim 1, wherein determining whether the proposed filled digital image includes computer-generated digital content is further based on determining with the local discriminator network whether the proposed hole-filling digital content is computer-generated digital content.

9. A method as described in claim 1, further comprising combining an output of the local discriminator network indicative of whether the proposed hole-filling digital content is computer-generated content with an output of the global discriminator network indicative of whether the proposed filled digital image includes computer-generated digital content, the combined output indicating whether the proposed hole-filling digital content is determined to be computer-generated digital content.

10. A method as described in claim 1, wherein the filled digital image is received as output from the image completer without image post-processing operations being performed in relation to the filled digital image or hole-filling digital content.

11. A method as described in claim 1, wherein the holey digital image has multiple holes.

12. A method as described in claim 1, further comprising discontinuing the iterations responsive to determining that detection of the computer-generated content by the discriminative neural networks surpasses a threshold difficulty.

13. A method as described in claim 12, further comprising outputting a proposed digital image including the proposed hole-filling digital content that was generated in an iteration performed immediately prior to the discontinuing.

14. A system comprising:
  an image completer having a framework that combines generative and discriminative neural networks to output filled digital images based on holey digital images received as input without performing image post-processing in relation to the filled digital images, the discriminative neural networks including a local discriminator network and a global discriminator network;
  at least one processor; and
  memory having stored thereon computer-readable instructions that are executable by the at least one processor to perform operations comprising:
    exposing a holey digital image to the image completer, the holey digital image having at least one hole comprising a group of contiguous pixels with values indicating an absence of depicted imagery; and
    receiving a filled digital image from the image completer, the filled digital image including hole-filling digital imagery generated by the generative neural network in place of the at least one hole, the hole-filling digital imagery further detected to be photo-realistic by the discriminative neural networks based, in part, on determining with the global discriminator network whether the filled digital image including the hole-filling digital imagery in place of the at least one hole includes computer-generated digital content.

15. A system as described in claim 14, wherein at least one of:
  the generative neural network is configured as a convolutional neural network having four intermediate dilated convolution layers;
  the generative neural network is configured without batch normalization layers;
  the generative neural network is activated to perform convolution operations for generating the filled digital image using an exponential linear unit (ELU) activation function;
  the generative neural network includes upscale layers arranged after the intermediate dilated convolution layers to resize output of the intermediate dilated convolution layers and perform an additional convolution operation on the output of the intermediate dilated convolution layers; or
  the generative neural network outputs the hole-filling digital imagery from an output layer without using sigmoid or tan h at the output layer.

16. A system as described in claim 14, wherein the global and local discriminator networks are separate convolutional neural networks.

17. A system as described in claim 14, further comprising detecting with the discriminative neural networks whether the hole-filling digital imagery is photo-realistic based further on determining with the local discriminator network whether the hole-filling digital imagery generated by the generative neural network in place of the at least one hole includes computer-generated digital content.

18. A non-transitory computer-readable storage media having instructions stored thereon that, when executed by one or more processors of a device, cause the device to perform operations comprising:
  exposing a holey digital image to an image completer having a framework that combines generative and discriminative neural networks using adversarial deep learning, the holey digital image having at least one hole comprising a group of contiguous pixels with values indicating an absence of depicted imagery, and the discriminative neural networks including a local discriminator network and a global discriminator network;
  generating hole-filling digital content with the generative neural network based, in part, on the depicted imagery of the holey digital image;
  determining with the discriminative neural networks of the image completer whether the hole-filling digital content is computer-generated digital content based, in part, on determining with the global discriminator network whether a filled digital image including the hole-filling digital content in place of the at least one hole includes computer-generated digital content; and
  receiving the filled digital image from the image completer, the filled digital image including the hole-filling digital content in place of the at least one hole.

19. A computer-readable storage media as described in claim 18, wherein determining whether the hole-filling digital content is computer-generated digital content is further based on determining with the local discriminator network whether the hole-filling digital content is computer-generated digital content.

20. A computer-readable storage media as described in claim 19, further comprising receiving a second filled digital image from the image completer responsive to the global discriminator network or the local discriminator network detecting computer-generated content.

* * * * *

UNITED STATES PATENT AND TRADEMARK OFFICE
CERTIFICATE OF CORRECTION

PATENT NO. : 10,614,557 B2
APPLICATION NO. : 15/785359
DATED : April 7, 2020
INVENTOR(S) : Zhe Lin et al.

Page 1 of 1

It is certified that error appears in the above-identified patent and that said Letters Patent is hereby corrected as shown below:

In the Claims

Column 23, Line 16, Claim 6 after "sigmoid or", delete "tan h", insert -- tanh --, therefor.

Column 24, Line 31, Claim 15 after "sigmoid or", delete "tan h", insert -- tanh --, therefor.

Signed and Sealed this
Twenty-sixth Day of May, 2020

Andrei Iancu
*Director of the United States Patent and Trademark Office*